United States Patent
Revie

[15] 3,660,115
[45] May 2, 1972

[54] SOLID PARTICULATE AROMATIC MATERIALS AND PROCESS FOR PREPARING SAME

[72] Inventor: Gilbert N. Revie, Cincinnati, Ohio
[73] Assignee: Fries & Fries Inc., Cincinnati, Ohio
[22] Filed: May 9, 1969
[21] Appl. No.: 823,530

[52] U.S. Cl. ..............................99/140 R, 99/78, 99/130, 99/166, 99/199, 252/89, 252/522
[51] Int. Cl. ............................................................A23l 1/26
[58] Field of Search.....................99/140, 199, 166, 78, 130; 252/316, 522, 89; 424/35, 36, 37; 34/5; 131/10 R, 9, 269

[56] References Cited

UNITED STATES PATENTS

| | | | |
|---|---|---|---|
| 2,166,074 | 7/1939 | Reichel | 252/316 |
| 2,886,447 | 5/1959 | Kramer et al. | 99/140 X |
| 3,219,461 | 11/1965 | Lamb | 99/199 X |
| 3,421,901 | 1/1969 | Mahlmann et al. | 99/199 X |
| 3,470,883 | 10/1969 | Shepherd et al. | 131/10 R |
| 3,479,191 | 11/1969 | Cole | 99/166 |
| 3,579,360 | 5/1971 | Rey et al. | 99/199 |

*Primary Examiner*—Morris O. Wolk
*Assistant Examiner*—Stephen B. Davis
*Attorney*—Wood, Herron & Evans

[57] ABSTRACT

An aqueous mixture containing water soluble or dispersible solids is freeze dried to form porous solids particles. The particles are impregnated with liquid aromatic materials such as essential oils, flavoring oils, or perfumes. The impregnated particles are coated with a film-forming material to seal the liquid within the interstices of the solid particles. Flavor containing particles can be incorporated within dry beverage or gelatin mixes and perfume containing particles can be added to detergents.

9 Claims, No Drawings

# 3,660,115

SOLID PARTICULATE AROMATIC MATERIALS AND PROCESS FOR PREPARING SAME

BACKGROUND OF THE INVENTION

Three principal techniques have heretofore been proposed for the preparation of solid flavoring or perfuming materials. These are the plating, spray-drying and encapsulation techniques. While each of these methods may be satisfactory to a greater or lesser extent for certain types of products, there are many types of products for which none of these methods is totally satisfactory.

More particularly, in a conventional plating technique a suitable powdered carrier, such as corn starch, is placed in the ribbon mixer with the flavoring material, for example lemon oil. As a consequence of agitation of the mixer, the powdered particles become coated with a layer of lemon oil. However, this oil is predominantly on the outside of the particle so that the flavoring product may be unstable due to the fact that the flavor can oxidize, evaporate and otherwise deteriorate.

In a typical spray-drying operation a flavoring, again for example lemon oil, is coated with a solid particulate material so that the flavor, e.g. lemon oil, is located largely within the particle. The solid coating is dried using large quantities of air usually at an elevated temperature of, for example, 250° to 450°. This type of spray-drying can cause changes to take place in the flavoring material and can also result in sizable losses of volatile constituents by evaporation. For example, if in the initial spray-drying mix the total weight of the flavoring oil is 25 percent of the total weight, the evaporation of oil often amounts to one-fifth of the total oil so that it is only 20 percent by weight of the final product. This loss may adversely affect the final flavor due to the fact that the lost flavoring material may be made up largely, or even entirely, of the very low boiling point constituents with the result that the loss of these constituents changes the flavor of the end product.

The third commonly employed prior art method is the technique of encapsulation. For example, in this method a flavoring oil can be dispersed in a gelatin powder which is precipitated around globules of oil. The difficulty with such encapsulated materials is that they are not truly water soluble. Thus, the flavoring oil in many cases does not escape and is not fully dispersed throughout the final food product which is usually formed of an aqueous mixture.

Accordingly, each of the prior art techniques inherently involves one or more of the following defects: a waste of expensive flavoring materials, a substantial deterioration in the taste or aroma of the flavored material, a short shelf life, or an inability of the material to become completely water dispersible in the final product.

SUMMARY OF THE INVENTION

This invention is directed to the preparation of aromatic materials in powdered or granular form having flavor or perfume properties heretofore usually present only in liquid aromatic materials. This invention involves the discovery that when certain water soluble or dispersible solids are freeze-dried to a porous solid matrix, liquid aromatic materials can be impregnated or sorbed in the matrix in large amounts for retention of their natural liquid aromatic properties. As used herein, the term "liquid aromatic" includes all materials either liquid or liquefied by solvent or other means which have a flavoring or perfuming property including, without limitation, essential oils, flavoring oils and perfumes.

The novel concept of this invention involves the freeze-drying of an aqueous mixture containing a normally solid solute to a porous solid having a network of interstices. Thereafter, an aromatic liquid is added to the porous solid to entrap the liquid in the interstices. While the exact mechanism is not completely understood, I have made the empirical discovery and determination that materials, including edible food solids, which are soluble or dispersible in an aqueous medium and freeze-dried to a porous, interstitial or capillary-like nature, can sorb or entrap aromatic liquids in the interstices for retention therein. The term "sorb" or "sorption" is meant to include absorption and adsorption by chemical and/or physical means which permits the preservation and retention of the flavoring oil and/or perfume in the solid matrix.

The process and product of this invention eliminates a number of disadvantages mentioned above in connection with the prior art techniques. First, freeze-drying to produce porous solids and sorbing the aromatic liquid therein to produce solid particulate aromatic materials eliminates the application of heat which has been a common characteristic of many prior art techniques. No heating is needed in accord with this invention to prepare the solid flavoring material having the liquid sorbed or entrapped therein. Thus, this invention eliminates the deleterious effects of heat which heretofore have characterized many prior art techniques. As mentioned, heat not only volatilizes the flavoring or perfuming material, but affects the essential flavor or taste of such material in processing.

For the first time, a "cold" (room or ambient temperature) technique in accordance with the principles of this invention have been developed which achieves entrapment of liquid aromatic materials in solid form. Moreover, minimal loss of essential and expensive liquid aromatic materials occurs in the conduct of this process. Additionally, it has been found that the taste and flavor of the solid particulate aromatic material is superior to any such solid flavoring materials heretofore prepared by known techniques. Moreover, my solid particulate material is dry and free-flowing and is adapted to form an aqueous flavoring or perfuming mixture upon the addition of water thereto resulting in a flavor or aroma substantially identical to that of the active ingredients in their liquid form before entrapment.

In another of its aspects, the process according to this invention includes a further step of coating the resultant freeze-dried powder or particles having the aromatic liquid entrapped therein. This is accomplished with a film-forming material which seals the entrances to the interstices of the porous solid and thereby helps to insure protection of the trapped or sorbed liquid from undesirable exposure to ambient atmospheres which could cause volatilization or reaction. Specifically, in those instances where aromatic liquids may be either exceedingly volatile or tend to react with ambient atmospheres, it has been found desirable to coat the solid aromatic particles with a material, such as a dextrin solution, a fat or other suitable substance, to seal off the liquid from such exposure.

In a preferred form, the process of this invention as utilized in the production of a flavoring material requires mixing a water soluble or dispersible food substance and water to form a system containing a solute. The term "solute" as used herein is defined as that solid material which is uniformly dispersed, dissolved or homogeneously contained in the aqueous mixture. This mixture is then freeze-dried according to well-known techniques.

Suitable techniques for freeze-drying are described in the literature; for example, in "Food Dehydration," Volume I, Principles, by W. B. Van Arsdell, published by AVI Publishing Co., Inc., Westport, Connecticut. Also, freeze-drying processes and suitable equipment for carrying out the process are described in prior art patents, including U.S. Pat. Nos. 3,404,007; 2,292,447; 2,509,681; 2,657,555; 2,620,573; 2,616,604; 3,192,645; 3,176,408 and 3,088,222.

The water is removed by sublimation from the frozen material and the solute is then left as a porous solid matrix having the characteristics aforementioned. Under magnification, this porous solid appears to be predominantly a network of interstices or capillary-like cavities which are interconnected. The matrix can be granulated or powdered as required to suitable particle size, for example of the order of 20-40 mesh, i.e. 0.6 to 0.8 mm., and still possess the essential porosity for entrapment or sorption of the aromatic liquid. The freeze-dried porous material can then be blended in any suitable apparatus, for example a ribbon blender, with the liquid aromatic material in the absence of heat to sorb or impregnate the powdered matrix. The matrix material is preferably chosen in relation to the entrapped aromatic liquid so that the matrix material is substantially insoluble in the liquid, e.g. is soluble to an extent of less than 5 percent.

Surprisingly, it has been found that large quantities of the liquid aromatic material on the order of about one-third or more parts by weight based upon the weight of the solid matrix can be added and a dry, free-flowing powder can still be obtained. Moreover, quantitative tests have demonstrated that the amount of impregnation or sorption of the liquid aromatic material is complete, that is to say, complete within the experimental accuracy of the method of quantitatively determining the amount of aromatic liquid material so impregnated or sorbed in the matrix. This advantage provides for utilization of expensive aromatic materials without waste. Moreover, not only is such complete entrapment obtained in the product and process according to this invention, but the liquid aromatic material is incorporated and is essentially retained in its original form.

The invention will be further understood with reference to the following examples:

EXAMPLE I

A 40 percent dextrin solution is freeze-dried. This is accomplished by a conventional technique such as that described in column 4 of U.S. Pat. No. 3,404,007. The freeze-dried material is then milled to a particle size of 20–40 mesh.

100 grams of this freeze-dried material are then combined with 50 grams of Orange oil. This is accomplished by mixing the materials in a suitable blender, such as a ribbon blender. This results in a dry, free-flowing powder having the advantages heretofore described. To ensure against atmospheric reaction or vaporization of the Orange oil in the solid matrix, the powder is given a protective coating to seal the entrances to the interstices or cavities in the porous particulate matrix. One suitable form of coating is a dextrin solution which has the property of forming an impermeable film for preventing the escape of permeation of the flavoring oil. This film can be applied in any suitable manner, as by spraying. The powder prepared in accordance with the above method possesses a strong orange flavor and can be used in any powdered preparation which requires such flavor. For example, an orange flavor drink powder may be made with: sugar, 100 gms; citric acid, 2 gms; orange flavor powder as prepared above, 0.25 gms; and certified color.

EXAMPLE II

A solution consisting of one gallon of water and 8 pounds of dextrin is freeze-dried and milled to a mesh of 20 gauge. A pineapple flavor composed of the following ingredients is prepared:

| | |
|---|---|
| Ethyl Iso Valerate | 200 cc |
| Ethyl Butyrate | 200 cc |
| Allyl Caproate | 100 cc |
| Oil Orange | 40 cc |
| Vanillin | 20 grams |
| Amyl Acetate | 10 cc |

Two pounds of the pineapple flavor is sprayed onto 8 pounds of the freeze-dried material. The resultant material forms a free-flowing powder of the type which can be used to flavor a variety of foods. One such example is gelatin desserts. For instance, the following gelatin dessert can be prepared:

| | |
|---|---|
| Gelatin Powder | 7 grams |
| Sugar | 76 grams |
| Citric Acid | 2 grams |
| Sodium Citrate | 0.15 grams |
| Above Pineapple flavor | 0.1 gram |
| Color | As desired |

The above mixture is dissolved in 1 pint of hot water and allowed to set.

EXAMPLE III

A dispersion is made from 3 pounds of lactose, 1 pound of gum acacia powder and 2 quarts of water. The mixture is freeze-dried and granulated to give a mesh size of 20 guage. To 6 pounds of this powder is added 2 pounds of Orange oil. This powdered flavor can be used to flavor an orange drink in the following manner:

| | |
|---|---|
| Sugar | 79 grams |
| Citric Acid | 3.16 grams |
| Orange Flavor above | 1.0 grams |
| Color | As desired |

EXAMPLE IV

A solution is made from 3.5 pounds of gum acacia and 1 gallon of water. It is freeze-dried and milled to a mesh of 40 guage. To 80 parts by weight of this powder is added, by spraying, 20 parts by weight of oil of lavender. The resultant product can be used to impart a pleasing aroma to powdered detergents when added at the rate of about 0.5 percent by weight of the detergent.

What is claimed is:

1. A process for the preparation of a free-flowing edible particulate aromatic material adapted to form an aqueous flavoring mixture upon the addition thereto of water comprising:
   freeze-drying an aqueous mixture containing an edible solute to form a freeze-dried water soluble solid, forming porous solid particles having a network of interstices,
   adding an aromatic liquid to said solid particles to entrap said liquid in said interstices and form the free-flowing particulate aromatic material, said entrapped liquid having its original aromatic properties preserved in said particle to impart a flavor or aroma in said aqueous flavoring mixture which is substantially identical to said original aromatic properties of said liquid and
   coating the resultant particles with a film-forming material to seal the entrances to the interstices of said porous solid particles and prevent said liquid from undesirable exposure to ambient atmospheres.

2. The process according to claim 1 wherein said coating is water soluble.

3. The process according to claim 1 wherein said liquid is added in an amount up to equal parts by weight of said solid particles.

4. The process according to claim 3 wherein said liquid amount is in the range of about one-third to about one-half parts by weight of said solid particles.

5. The process according to claim 1 wherein said solute is colloidally dispersed in said aqueous mixture.

6. The process according to claim 5 wherein said edible food substance is a gum.

7. A solid free-flowing edible particulate aromatic material adapted to form an aqueous flavoring mixture upon the addition of water thereto comprising:
   freeze-dried, porous edible water soluble solid particles, each characterized by a network of interstices,
   an aromatic liquid sorbed in said interstices, said sorbed liquid having its original aromatic properties preserved in said solid particles to impart a flavor or aroma to said aqueous mixture substantially identical to said original aromatic properties of said liquid and
   a coating on said particles protecting said aromatic liquid.

8. The product of claim 7 wherein said aromatic liquid is contained in an amount up to equal parts by weight of said porous solid particles.

9. The product of claim 7 in which said coating is a water soluble coating.

* * * * *